(12) United States Patent
Sajid et al.

(10) Patent No.: US 12,455,814 B2
(45) Date of Patent: Oct. 28, 2025

(54) GRAYWARE ANALYSIS

(71) Applicant: International Business Machines Corporation, Armonk, NY (US)

(72) Inventors: Md Sajidul Islam Sajid, Charlotte, NC (US); Frederico Araujo, Mahopac, NY (US); Teryl Paul Taylor, Colorado Springs, CO (US); Jiyong Jang, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 202 days.

(21) Appl. No.: 18/345,228

(22) Filed: Jun. 30, 2023

(65) Prior Publication Data

US 2025/0004922 A1  Jan. 2, 2025

(51) Int. Cl.
*G06F 11/3698* (2025.01)
*G06F 21/53* (2013.01)

(52) U.S. Cl.
CPC .......... *G06F 11/3698* (2025.01); *G06F 21/53* (2013.01); *G06F 2221/033* (2013.01)

(58) Field of Classification Search
CPC . G06F 11/3698; G06F 21/53; G06F 2221/033
USPC .................................................. 717/131–150
See application file for complete search history.

(56) References Cited

U.S. PATENT DOCUMENTS

| | | | | |
|---|---|---|---|---|
| 7,434,218 B2 * | 10/2008 | Fries | ................... | G06F 9/45537 718/1 |
| 7,634,262 B1 * | 12/2009 | Li | ..................... | H04M 1/72406 370/252 |
| 7,934,261 B1 * | 4/2011 | Saguiguit | .............. | G06F 21/568 726/24 |
| 8,499,354 B1 | 7/2013 | Satish et al. | | |
| 9,083,733 B2 | 7/2015 | Georgiev | | |
| 9,823,737 B2 * | 11/2017 | Mazed | ................... | G06V 20/20 |
| 9,912,680 B2 | 3/2018 | Torres et al. | | |
| 10,230,749 B1 * | 3/2019 | Rostami-Hesarsorkh | ................... | G06F 21/56 |
| 10,305,929 B2 | 5/2019 | Kulkarni et al. | | |
| 10,482,250 B1 * | 11/2019 | Joshi | ....................... | G06F 21/55 |
| 10,616,267 B2 | 4/2020 | Bartos et al. | | |
| 11,036,856 B2 * | 6/2021 | Graun | .................... | G06F 21/53 |

(Continued)

FOREIGN PATENT DOCUMENTS

| | | |
|---|---|---|
| CN | 102082802 A | 6/2011 |
| JP | 5851311 B2 | 2/2016 |

OTHER PUBLICATIONS

Spreitzenbarth, et al, "Mobile-Sandbox: Having a Deeper Look into Android Applications", ACM, pp. 1-8 (Year: 2013).*

(Continued)

*Primary Examiner* — Anil Khatri
(74) *Attorney, Agent, or Firm* — Tutunjian & Bitetto, P.C.; Anthony Mauricio Pallone

(57) ABSTRACT

Methods and systems for grayware analysis include running a software application in a sandbox. Activity information is collected from the software application that represents actions performed by the software application within an environment of the sandbox. The collected activity information is matched to a grayware activity description to identify the software application as performing a grayware activity. A corrective action is performed on the software application.

16 Claims, 6 Drawing Sheets

(56) References Cited

U.S. PATENT DOCUMENTS

| | | | | |
|---|---|---|---|---|
| 11,113,389 | B1* | 9/2021 | Salehpour | G06F 21/561 |
| 11,321,453 | B2* | 5/2022 | Kosarev | G06F 21/53 |
| 11,405,237 | B2* | 8/2022 | Rudnik | H04L 63/0281 |
| 2019/0068641 | A1* | 2/2019 | Araujo | G06F 21/566 |
| 2020/0210647 | A1* | 7/2020 | Panuganty | G06N 3/08 |
| 2022/0124102 | A1 | 4/2022 | Zhang et al. | |

OTHER PUBLICATIONS

Suarez-Tangil, et al, "Evolution, Detection and Analysis of Malware for Smart Devices", IEEE, pp. 1-27 (Year: 2014).*

Dunlap et al, "A Study of Application Sandbox Policies in Linux", ACM, pp. 1-12 (Year: 2022).*

Guo et al, "The Achieve of Power Manager Application Honey Pot Based on Sandbox", IEEE, pp. 1-5 (Year: 2015).*

Blasing et al, "An Android Application Sandbox System for Suspicious Software Detection", IEEE, pp. 1-8 (Year: 2010).*

Endicott, S., Attackers are Stealing Data With Fake Microsoft Store App Listings, Retrieved from: https://www.windowscentral.com/attackers-stealing-data-fake-microsoft-store-app-listings, Apr. 21, 2021, 13 pages.

Huillet, M., Detected Cryptojacking Prompts Microsoft to Remove Eight Free Apps from Microsoft Store, Retrieved from: https://cointelegraph.com/news/detected-cryptojacking-prompts-microsoft-to-remove-eight-free-apps-from-microsoft-store, Feb. 15, 2019, 7 pages.

Tavares, P., Electron Bot Malware is Disseminated via Microsoft's Official Store And is Capable of Controlling Social Media Apps, Retrieved from: https://www.infosecinstitute.com/resources/malware-analysis/electron-bot-malware-is-disseminated-via-microsofts-official-store-and-is-capable-of-controlling-social-media-apps/, May 18, 2022, 8 pages.

* cited by examiner

GRAYWARE ANALYSIS

STATEMENT REGARDING FEDERALLY SPONSORED RESEARCH OR DEVELOPMENT

This invention was made with Government support under Contract No. W911NF-13-2-0045 awarded by the Army Research Office. The Government has certain rights in this invention.

BACKGROUND

The present invention generally relates to software analysis and, more particularly, to grayware analysis in app stores.

Grayware applications are software programs that perform functions that are unknown to, and unwanted by, the user. Such applications may gather sensitive information relating to the user's computing habits, their identity and personal lives, and their business secrets. This information may be gathered without the user's knowledge or consent. Grayware may also degrade the performance, stability, and productivity of the systems that they are installed on. Unlike malware, grayware may not generally cause harm to the user's device or data.

SUMMARY

A method for grayware analysis includes running a software application in a sandbox. Activity information is collected from the software application that represents actions performed by the software application within an environment of the sandbox. The collected activity information is matched to a grayware activity description to identify the software application as performing a grayware activity. A corrective action is performed on the software application.

A system for grayware analysis includes a hardware processor and a memory that stores a computer program. When executed by the hardware processor, the computer program causes the hardware processor to run a software application in a sandbox, to collect activity information from the software application that represents actions performed by the software application within an environment of the sandbox, to match the collected activity information to a grayware activity description to identify the software application as performing a grayware activity, and to perform a corrective action on the software application.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Grayware applications take many forms, often being disguised as legitimate software to trick a user into installing it. In some cases, the grayware functions of an application may lay dormant for some period of time before being activated. With the advent of app stores, referring to repositories of software that is compatible with a particular device or category of devices, finding and installing software is a simple process for users, but ensuring the safety of that software is not as simple a task and is outside of the abilities of most users. These app stores are available for mobile devices as well as for desktop environments, and each app store may have different security policies.

In some cases, applications obtained through an app store may run within a container to improve security and performance. However, some app stores and operating systems allow the software to run outside a container, directly on the host device, by specifying full-trust capabilities. This may be a choice made by the software developer, rather than by the user. Additionally, the lack of continuous monitoring and security checks within a given application's supply chain can allow attackers to insert grayware onto an app store.

To address this concern, apps from an app store may be run within a sandbox to collect runtime execution logs, for example monitoring system events, file activities, network activities, and registry activities. An ontology is built to help describe and identify grayware behavior. The runtime execution logs may be processed using the ontology to analyze collected traces and classify any grayware into threat levels. Based on this analysis, action can be taken to confine any security hazards, such as changing permissions for the application, disabling the application from running on the device, and denying access to the application on the app store.

Figure 1:
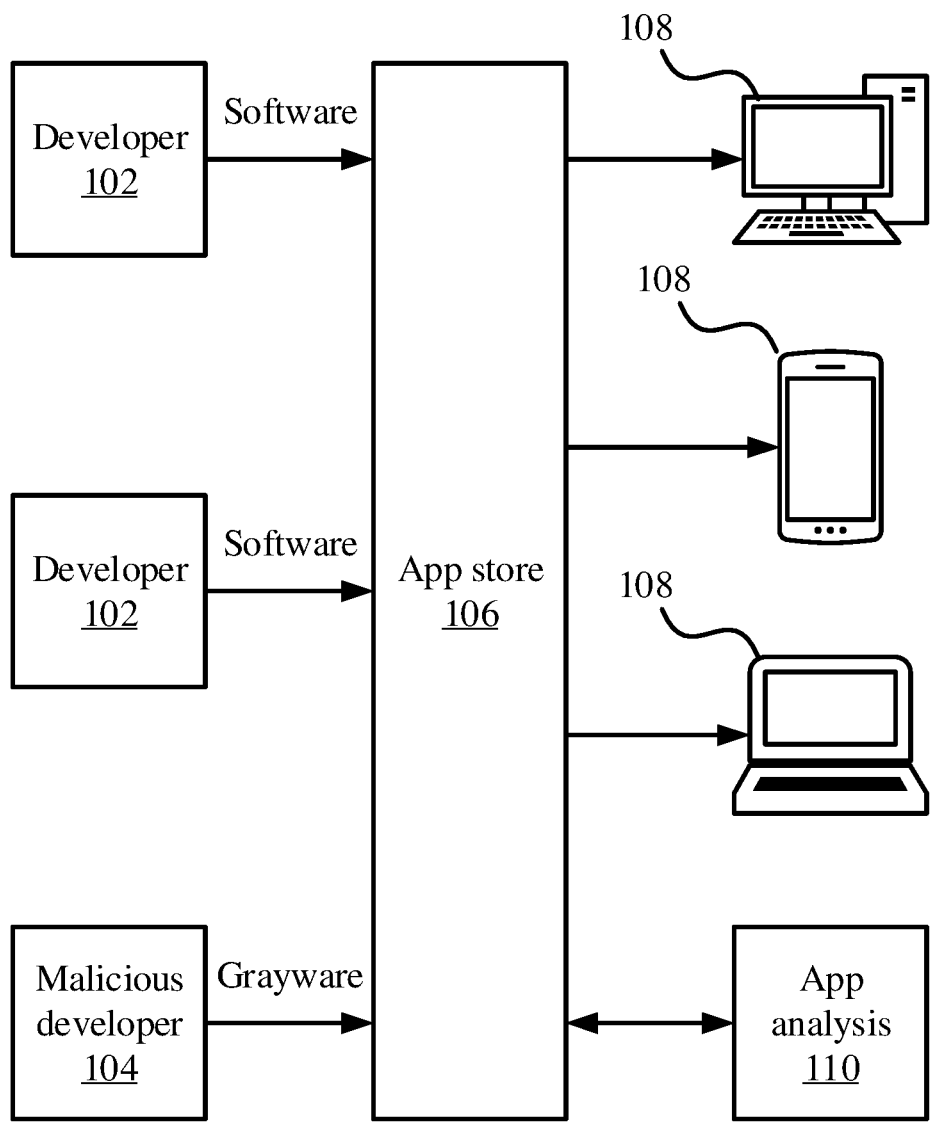
FIG. 1 is a block diagram of a distributed computing environment that includes an app store with grayware analysis, in accordance with an embodiment of the present invention.

Referring now to FIG. 1, a diagram of an application distribution supply chain is shown. Following the expected course of events, developers 102 create software, which they provide to the app store 106 for distribution. The app store 106 may be a service that includes software from multiple developers 102 and may include a number of policies and internal software analysis that is performed to promote the security of the software it distributes. Software applications that are stored on the app store 106 may be searched, downloaded, and installed by any of a variety of user devices 108. Exemplary user devices include desktop computers, laptop computers, tablets, and smartphones.

Users may have control over the access that downloaded software has to the user devices 108. For example, in some cases app store software on the user devices 108 will prompt the user to give access to a given software application before installation or execution, reflecting the functions that the software application is designed to perform. Thus, a user may be prompted for permission to access location information or for access to a camera or other sensors on the user device 108.

In some cases, a malicious developer 104 may introduce grayware into the app store 106. The grayware may be legitimate on its face, and may perform legitimate functions, but may additionally perform grayware behavior that the user is not aware of. While user permissions can stop some such behavior, other grayware behavior can be disguised as legitimate. For example, a location tracking application may have a legitimate purpose, but the user may not expect the application to report that information to third parties. Analysis within the app store 106 may miss such behavior, and no outward sign may be presented to the user to alert them.

However, app analysis 110 may also be performed on software that downloaded from the app store 106. In some cases, app analysis 110 may be performed by a standalone service that downloads software applications from the app store 106 and performs an independent analysis. In some cases, app analysis 110 may be integrated with the app store 106 to perform internal analysis. In some cases, app analysis 110 may be integrated with a user device 108 to identify locally installed grayware.

The unwanted behaviors performed by grayware may include, for example, displaying intrusive advertisements, collecting user data without explicit consent, modifying browser settings, and exhibiting disruptive behaviors that impact system performance. Other notable grayware behaviors may include exaggerated or inaccurate notifications, lack of control by the user, unwanted processes or applications that consume computing resources, and unconventional requirements for uninstalling the application. There are some software applications that, when installed, install other bundled applications that a user may not want. These software applications may attempt to trick users with options that allow the installation of the bundled software, which may include additional grayware.

One exemplary type of grayware is adware, which displays intrusive advertisements on user devices 108. This type of grayware generates revenue for developers by delivering excessive and disruptive ads to mobile users, for example within apps or web browsing experiences. Adware can further decrease device performance by consuming data bandwidth and by intruding on the user's experience.

Scareware is a type of grayware that employs deceptive tactics to frighten or trick users into taking certain actions, such as purchasing fake antivirus software or paying for unnecessary services. Scareware exploits users' fears about their systems' security, often through misleading pop-ups or fake security alerts. This type of grayware deceives users into making unnecessary purchases and potentially exposes them to other security risks.

Spyware is a type of grayware that covertly monitors and records user activities without the user's knowledge or consent. Spyware may collect sensitive information such as keystrokes, browsing habits, location information, login credentials, and personal data, thereby compromising user privacy and exposing confidential information that can lead to identity theft, financial loss, and unauthorized access to sensitive systems.

Redirected promotion applications are a type of grayware that redirect users to external web content outside of the software application, for example requiring the user to follow social media accounts or to perform specific tasks to continue using the app's services. The purpose of such software applications is often to promote third-party applications and to generate downloads by offering incentives or withholding features. The impact of such grayware includes exposure to potentially malicious or unwanted software, which compromises user security and provides a frustrating user experience.

Figure 2:
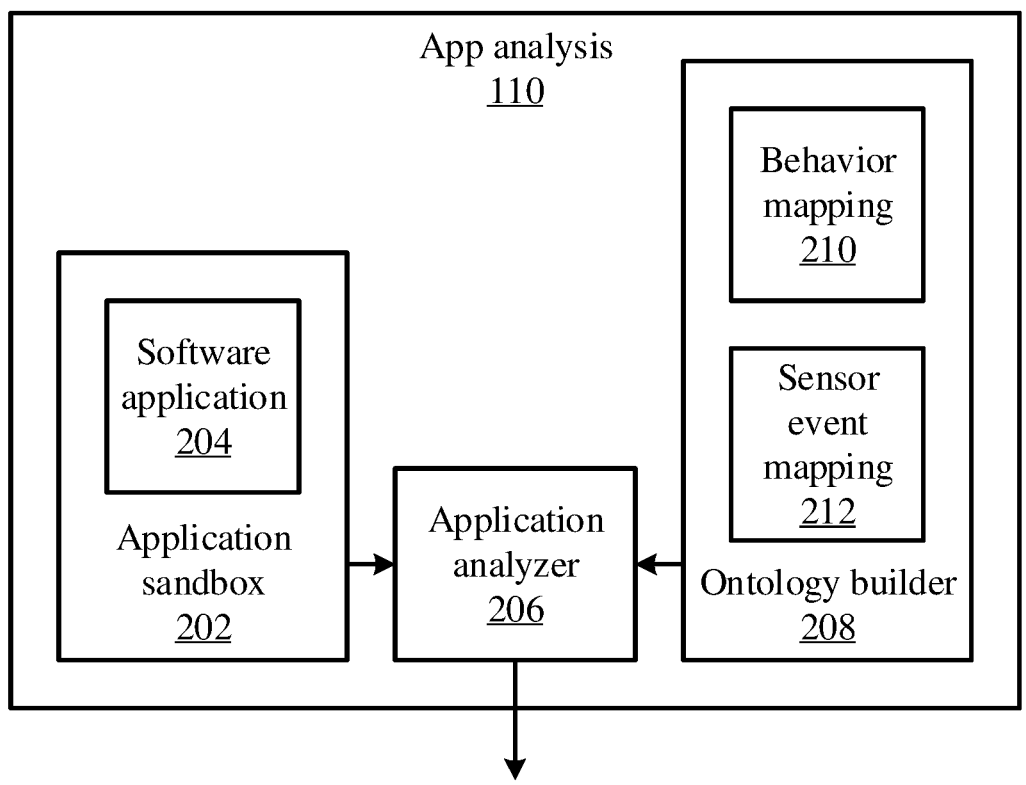
FIG. 2 is a block diagram of an application analysis system that analyzes software from an app store in a sandbox to identify grayware behaviors, in accordance with an embodiment of the present invention.

Referring now to FIG. 2, additional detail on the app analysis 110 is shown. A software application 204 is downloaded from an app store 106 and is installed within an application sandbox 202. The application sandbox 202 presents a software and hardware environment to the software application 204 that replicates the environment of a user device 108. In some cases, the application sandbox 202 may include hardware emulation that can appear as one or more different user devices 108. In some cases, the application sandbox 202 may include multiple different software environments, including different sets of operating systems, operating system versions, and other installed software. For example, the software application may include conventional executable formats and/or new packaging formats such as MSIX and APPX formats, which may include containerized package formats that consolidate code, resources, and dependencies.

The software application 204 is executed within the application sandbox 202, which collects detailed execution traces. The software application 204 may be executed for a predetermined amount of time, or until any other appropriate termination condition is reached. During execution, the application sandbox 202 captures system monitor logs, network activities, file operations, registration operations, and notification activities. Accesses to peripherals, such as webcams, device location sensors, microphones, and clipboards, the application sandbox may monitor specific registry keys that indicate such access. Screenshots within the application sandbox may be taken periodically (e.g., every fifteen seconds) to provide a visual record of the application's behavior and actions. All of this collected information may be provided to application analyzer 206 to look for grayware behavior.

An ontology builder 208 generates a knowledge base that include behavior mapping 210 between diverse grayware behavior descriptions, obtained from various security vendors, and descriptions of threat intelligence. The knowledge base further includes sensor event mapping 212 between the behavior mappings 210 and telemetry/data sensors, for example using keywords and metadata associated with the data sensors and their events. The knowledge base operates as a framework that identifies specific data sources and events that are relevant for identification purposes, for the determination of corresponding grayware behaviors.

The knowledge base framework may include information from multiple sources, including security vendors, software developers, and domain expertise, and may include low-level technical observables such as telemetry data to high-level goals and courses of action. Behavior descriptions may similarly be sourced from security vendors. Although the behavior descriptions may provide extensive lists and descriptions of unwanted behaviors, some descriptions may initially be relatively sparse. The knowledge base framework and the behavior descriptions may be fused by a mapping process using text similarity analysis.

Mapping from behaviors to the knowledge base can be accomplished using a term frequency inverse document frequency (TF-IDF) approach to identify terms that are frequent within a specific document but that are infrequent in an overall collection. TF-IDF helps to identify terms that carry meaningful information about the document's content.

The ontology builder 208 can thereby prioritize important keywords or features for mapping, specifically for descriptions of grayware behavior.

Thus, ontology builder 208 can perform text preprocessing to remove noise, such as punctuation and stop words, from the behavior descriptions, applying stemming or lemmatization to standardize and reduce the dimensionality of the behavior description inputs. The preprocessed text is converted into a matrix, where rows represent descriptions and columns represent unique terms. The values in the matrix can be term frequency, TF-IDF, or any other appropriate term weighting scheme. Weights may then be assigned to each term in the document-term matrix based on its frequency in the document and its rarity in the corpus, for example using TF-IDF. The ontology may be updated on an ongoing basis, driven by new threat intelligence. For example, newly discovered grayware behaviors may be obtained from external sources.

The mapping may be performed using a linguistic vector analysis. The similarity between TF-IDF-weighted vectors of the framework and the description text blobs can be determined using any appropriate metric, such as cosine similarity, with higher values indicating greater similarity. The framework may represent a predetermined set of categories and classifications that can be used to identify different kinds of grayware. The similarity scores may then be ranked in descending order to find the closest matching framework categories for each behavior description. The top-ranked categories may be selected to determine the mapping.

As noted above, preprocessing can be used to improve the behavior descriptions. While the original behavior description documents may be obtained from reputable sources and may provide comprehensive listings and detailed descriptions for most unwanted application behaviors, some behaviors may have limited explanations of only a few lines. The descriptions may therefore be enriched, for example using targeted searches for blog posts and technical reports that describe the behaviors in question. These sources may be used to elaborate on particular behavior descriptions. In some cases, a language model may be used to automatically summarize the collected sources to generate an enriched behavior description.

In some embodiments, the set of grayware behaviors may be identified as $C=c_1, c_2, \ldots, c_k$ and the set of terms in a document-term matrix may be identified as $v=v_1, v_2, \ldots, v_m$. This document-term matrix may be created from the preprocessed document data into a matrix where rows represent documents and columns represent unique terms in the document. The values in the matrix may be defined as a term weighting scheme, such as TF-IDF. A vector representation of a given document d may be represented as [TFIDF(d, $v_1$), TFIDF(d, $v_2$), ..., TFIDF(d, $v_m$)], while a vector representation of a given behavior c may be represented as [TFIDF(c, $v_1$), TFIDF(c, $v_2$), ..., TFIDF(c, $v_m$)]. The similarity score between documents and behaviors may be calculated using an appropriate metric, such a cosine similarity. The term $v_m$ identifies a term in the document, with m representing the number of terms in the document, and k is the cardinality of behaviors in the ontology.

When an unwanted behavior is identified, a description of the behavior may be generated with examples of procedures associated with it. There is a significant overlap of word usage and contextual similarity between enriched behavior descriptions and the descriptions of the technique and its associated procedures.

Using the execution traces generated by the software application 204 in the application sandbox 202 and the knowledge base generated by the ontology builder 208, application analyzer looks for patterns in the execution traces that match grayware behaviors in the knowledge base. Specific events from the software application 204 may be identified as being related to grayware behaviors. Specific sensors and events identified within the knowledge base may be used as a basis for examining the software application. Any URLs or other external data accesses may further be analyzed for an additional assessment. The application analyzer 206 generates a report on the software application 204 that may include an indication of its status as grayware, an identification of specific grayware behaviors and corresponding threat levels, and instructions for corrective actions. In some cases, the instructions for corrective actions may include automatically issued commands to limit the permissions of the software application on a user's device 108, to disable the execution of the software application on a user's device, to flag the software application as risky within the app store 106, and to disable downloading and installing the software application from the app store 106.

Considering the available sensor data and the associated events, application analyzer 206 maps the data sources to the behavior in question. This may include automated mapping using keywords and/or manual mapping by experts. To facilitate the automated mapping, a curated set of alternative keywords may be used to encapsulate similar actions or contexts for each data sensor and its corresponding events.

For example, one event that may be detected is a process creation event. Relevant terms may include, "create," "creating," "open," "opening," "application," "process," "program," and "child," as well as popular applications like "browser" and "game." These keywords effectively represent similar actions or contexts associated with the event. By searching for these keywords in a behavior description, mappings may be established. The presence of these keywords indicates a reliance on the software application 204 on specific data sensors and attributes to achieve its behaviors. While this automated approach establishes initial mappings, they can be further improved by manual review, using in-depth knowledge to refine and validate the automatically generated mappings.

Figure 3:
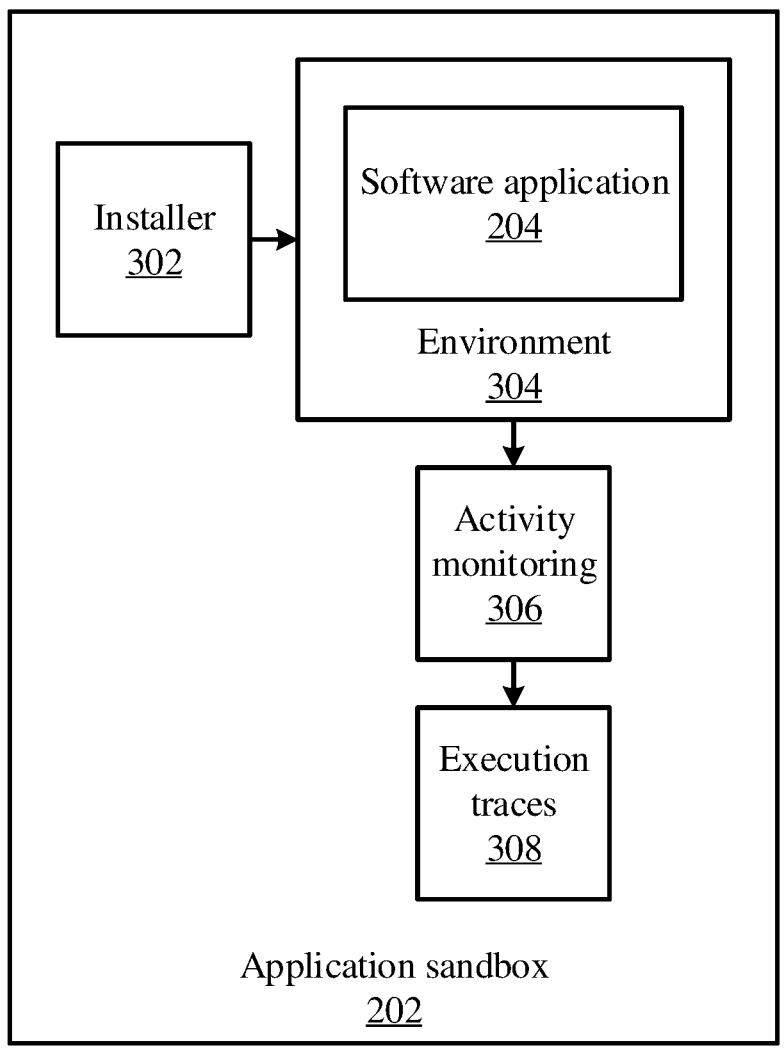
FIG. 3 is a block diagram of an application sandbox that may be used to execute software from an app store to collect information for grayware analysis, in accordance with an embodiment of the present invention.

Referring now to FIG. 3, additional detail on the application sandbox 202 is shown. An installer 302 accesses the app store 106, for example searching for a given application and downloading the application to the application sandbox 202. The installer 302 loads the software application 204 into an environment 304 that includes any software and hardware emulation needed for the software application 204 to run.

Activity monitoring 306 observes and records actions taken by the software application 204 within the environment. These actions may include system calls, network activities, file operations, registry operations, notification actions, and accesses to hardware such as peripherals. In some cases, activity monitoring may include a registry monitor that observes changes to configuration settings for the environment's operating system and software. Registry monitoring may include taking snapshots of a hierarchical registry database. Activity monitoring 306 outputs execution traces 308 to record the actions taken by the software application 204.

In an example of registry monitoring, the HKCR, HKLM, HKCU, HKU, and HKCC registry hives of a WINDOWS® operating system may be monitored. HKCR includes information about registered file types and associated programs.

HKLM includes system-wide settings that apply to all users. HKCU includes settings specific to the current user. HKU includes information about all active user profiles on a device. HKCC includes information about the current hardware configuration of the system. Thus, to determine whether the software application 204 accesses a webcam, microphone, or location without user consent, respective registry values may be monitored for modifications.

Activity monitoring may further include file activity monitoring, for example monitoring specified folders or directories for changes, which may include file creation, modification, deletion, or movement. Sensitive files, relating to system file access or credential file access, may be monitored in particular to detect security threats.

Activity monitoring may further include network activity monitoring, for example using packet analysis to observe network traffic conducted by the software application 204. This packet analysis may include packet inspection, filtering, and dissection, and may reflect the exfiltration of user data to third parties.

Activity monitoring may further include system monitoring, for example using monitoring tools provided by the operating system in the environment 304 to track process creation, network connections, file creation, registry modifications, and other system calls. Such events may be used to identify the functions and behaviors of grayware.

Activity monitoring may further include notification monitoring, for example collecting notification messages generated during the analysis period. Scareware often uses such notifications as a way to communicate false or deceptive information to the user.

Activity monitoring may further include screenshotting, for example taking screenshots of a visual interface within the environment 304. The screenshots provide a visual record that can provide insights toward the software application's behavior and actions.

In one specific example, the app store 106 may be the MICROSOFT® Store, with the environment 304 including an instance of the WINDOWS® operating system. WinAppDriver is a service within WINDOWS® that provides user interface test automation for software applications, providing the testing of Universal WINDOWS® Platform (UWP), WINDOWS® Forms (WinForms), WINDOWS® Presentation Foundation (WPF), and Classic WINDOWS® (Win32) applications on systems running WINDOWS® version 10.

To simulate realistic user/application interactions, activity monitoring 306 periodically generates a list of clickable buttons that are visible on a user interface in the environment 304, for example every thirty seconds. A button may then be automatically and randomly clicked and any resulting activity by the software application 204 is recorded.

Figure 4:
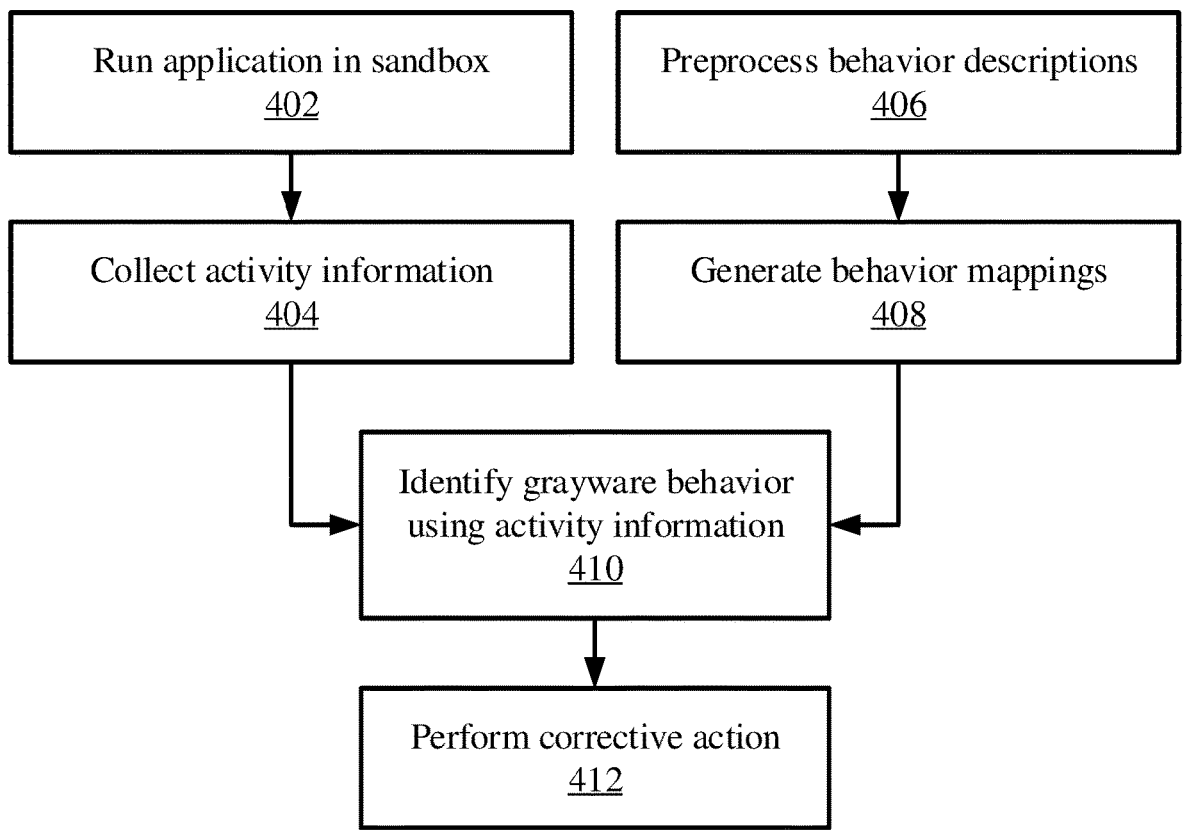
FIG. 4 is a block/flow diagram of a method for grayware analysis, in accordance with an embodiment of the present invention.

Referring now to FIG. 4, a method of detecting and responding to grayware is shown. Block 402 runs the application 204 in the application sandbox 202. As noted above, this may include searching for the application 204 in the app store 106, downloading the software application 204, installing the software application 204 in the environment 304 of the application sandbox 202, configuring the software application 204, and executing the software application 204. Block 404 then collects activity information from the software application 204, which may include execution traces, system calls, file activity, network activity, sensor accesses, and any other appropriate activity.

Parallel to, before, or after the execution of the application 204 in the application sandbox 202, ontology generation may be performed. Block 406 preprocesses behavior descriptions, which may include obtaining grayware behavior descriptions and enriching and/or denoising the grayware behavior descriptions. Block 408 generates behavior mappings, creating vector representations of the behavior descriptions and correlating them with particular activities and activity patterns that a software application may perform.

Using the collected information and the behavior mappings, block 410 identifies grayware behavior from the software application 204. This identification may include classification of the type of grayware and generating an explanation of the activities leading to the identification. Block 412 then performs a corrective action. As noted above, the corrective action may include local device actions, for example changing settings on a user device 108 to limit the impact of the grayware or to disable it entirely. The corrective action may also, or alternatively, include actions at the app store 106, for example removing the software application 204 from the app store 106 or providing a flag or warning to users of its potential for unwanted behavior.

In some cases, the corrective action may be tailored to the specific category of grayware behavior that is exhibited by the software application 204. For example, if the software application 204 is surreptitiously collecting data from specific sensors, such as a location sensor, then access privileges to that sensor may be revoked from the software application 204. If the software application 204 accesses or alters sensitive files, then access to those files may be limited or revoked. If the software application 204 transmits sensitive data, or transmits data to a known bad actor, then packet filtering may be used to selectively limit that transmission. Tailoring the corrective action in this manner can limit the impact of the grayware behavior without preventing the software application 204 from running entirely.

Figure 5:
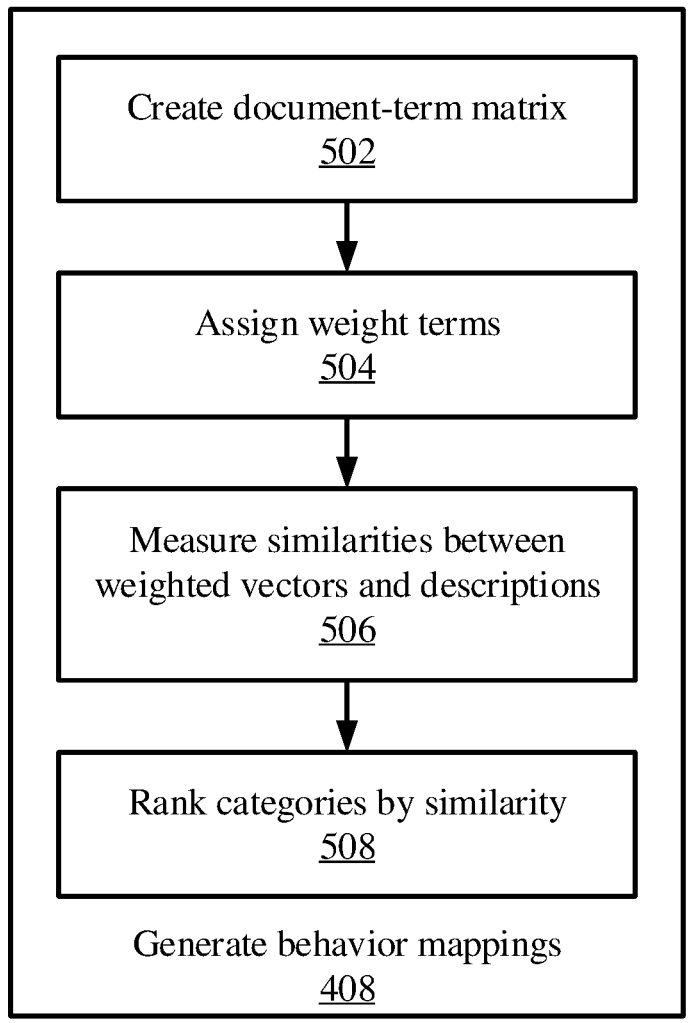
FIG. 5 is a block/flow diagram of a method for generating mappings between grayware behavior and descriptions thereof, in accordance with an embodiment of the present invention.

Referring now to FIG. 5, additional detail on the generation of behavior mappings 408 is shown. Block 502 creates a document-term matrix, for example converting the preprocessed text into a matrix with rows that represent documents (e.g., respective grayware behavior descriptions) and with columns that represent unique terms. The values in the matrix may represent any appropriate term weighting, such as term frequency or TF-IDF. Weights are assigned to each term in the document-term matrix in block 504, for example using TF-IDF.

Block 506 measures the similarities between the weighted vectors representing a grayware framework and the text of the descriptions. The similarity may be measured using any appropriate metric, such as cosine similarity, with higher values representing a greater similarity. The scores are ranked in block 508, with the closest matching categories from the framework being selected to classify the behavior descriptions. The selection of categories may pick a predetermined number of top-ranked categories or may pick categories having an above-threshold similarity score.

Figure 6:
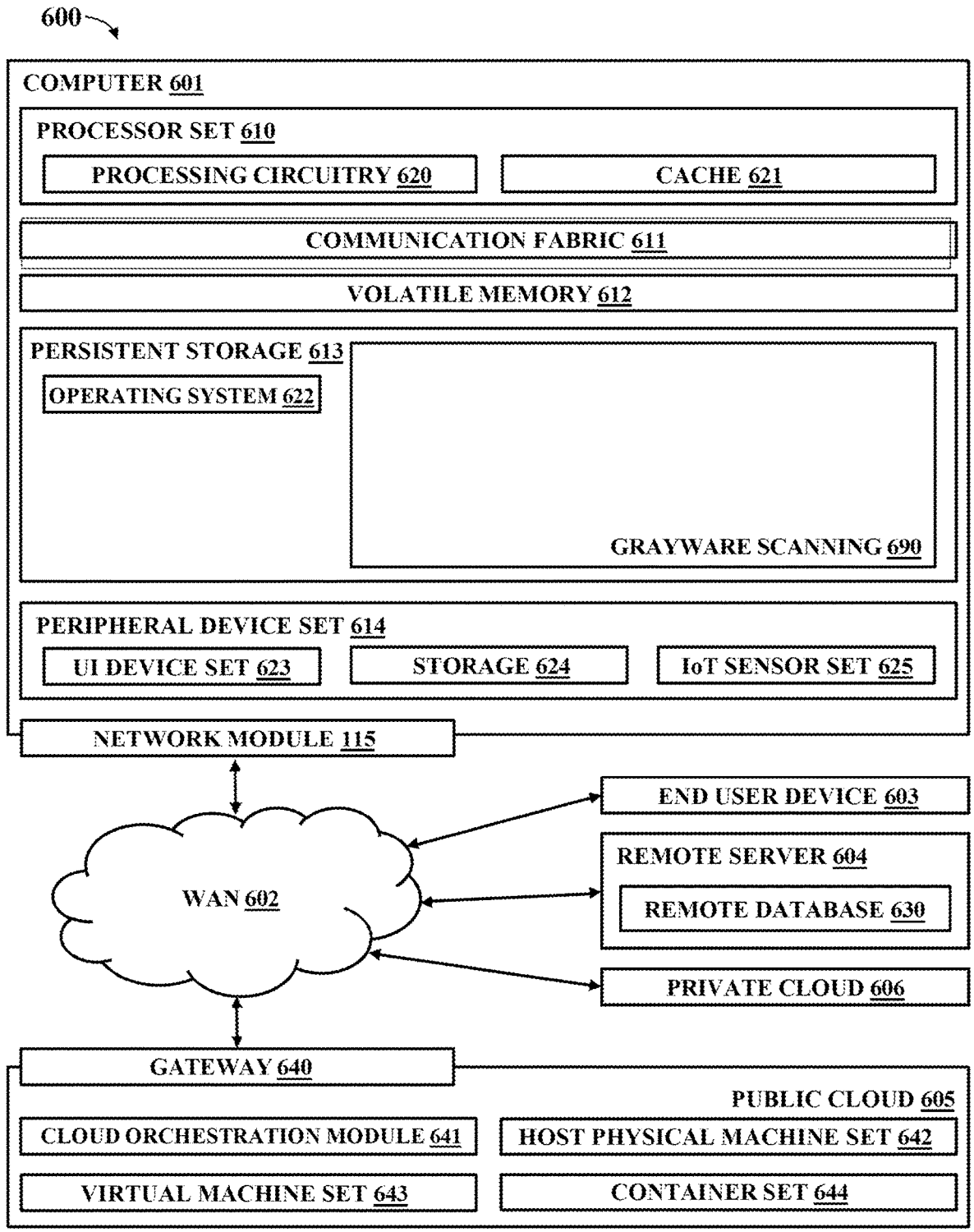
FIG. 6 is a block diagram of an exemplary computing environment that can perform grayware scanning, in accordance with an embodiment of the present invention.

Referring now to FIG. 6, an exemplary computing environment 600 is shown. Computing environment 600 contains an example of an environment for the execution of at least some of the computer code involved in performing the inventive methods, such as grayware scanning 690. In addition to block 200, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 200, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 200 in persistent storage 613.

COMMUNICATION FABRIC 611 is the signal conduction path that allows the various components of computer 601 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 614 includes the set of peripheral devices of computer 601. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then his historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of grayware analysis (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for grayware analysis, comprising:
    mapping a set of grayware activity descriptions to grayware categories using linguistic vector analysis;
    running a software application in a sandbox;
    collecting activity information from the software application that represents actions performed by the software application within an environment of the sandbox;
    matching the collected activity information to a grayware activity description to identify the software application as performing a grayware activity; and
    performing a corrective action on the software application that is tailored to the grayware activity, to limit an impact of the grayware activity without stopping the software application from running otherwise.

2. The method of claim 1, wherein mapping includes forming a document-term matrix from the set of grayware activity descriptions, with rows of the document-term matrix representing respective grayware activity descriptions and with columns of the document-term matrix representing individual terms.

3. The method of claim 2, wherein a category is selected based on the similarity score to determine information about the grayware activity.

4. The method of claim 1, wherein mapping includes determining a similarity score between a vector representing a grayware activity description and a vector representing a category of grayware behavior.

5. The method of claim 1, further comprising downloading the software application from a remote app store prior to running.

6. The method of claim 5, wherein performing the corrective action includes disabling access to the software application on the remote app store.

7. The method of claim 1, wherein collecting activity information includes monitoring system event logs, network activities, file operations, registry operations, notification activities, and peripheral accesses, and further includes taking periodic screenshots.

8. The method of claim 1, wherein matching the collected activity information to a grayware activity description includes comparing the collected activity information to behaviors in an ontology that has descriptions for a plurality of different grayware behavior types to identify a relevant grayware behavior.

9. A computer program product for grayware analysis, the computer program product comprising a computer readable storage medium having program instructions embodied therewith, the program instructions executable by a hardware processor to cause the hardware processor to:
    run a software application in a sandbox;
    collect activity information from the software application that represents actions performed by the software application within an environment of the sandbox;
    match the collected activity information to a grayware activity description to identify the software application as performing a grayware activity; and
    perform a corrective action on the software application that is tailored to the grayware activity, to limit an impact of the grayware activity without stopping the software application from running otherwise.

10. A system for grayware analysis, comprising:
a hardware processor; and
a memory that stores a computer program which, when executed by the hardware processor, causes the hardware processor to:
wherein the computer program further causes the hardware processor to map a set of grayware activity descriptions to grayware categories using linguistic vector analysis;
ran a software application in a sandbox;
collect activity information from the software, application that represents actions performed by the software application within an environment of the sandbox;
match the collected activity information to a grayware activity description te identify the software application as performing a grayware activity; and
perform a corrective action on the software application that is tailored ta the grayware activity, to limit an impact of the grayware activity without stopping the software application from running otherwise.

11. The system of claim 10, wherein the computer program further causes the hardware processor to form a document-term matrix from the set of grayware activity descriptions, with rows of the document-term matrix representing respective gray ware activity descriptions and with columns of the document-term matrix representing individual terms.

12. The system of claim 11, wherein a category is selected based on the similarity score to determine information about the grayware activity.

13. The system of claim 10, wherein the computer program further causes the hardware processor to determine a similarity score between a vector representing a gray ware activity description and a vector representing a category of grayware behavior.

14. The system of claim 10, wherein the computer program further causes the hardware processor to download the software application from a remote app store prior to running.

15. The system of claim 14, wherein the computer program further causes the hardware processor to disable access to the software application on the remote app store.

16. The system of claim 10, wherein the computer program further causes the hardware processor to monitor system event logs, network activities, file operations, registry operations, notification activities, and peripheral accesses, and further includes taking periodic screenshots.

* * * * *